United States Patent
Pilone

(10) Patent No.: US 12,535,156 B2
(45) Date of Patent: *Jan. 27, 2026

(54) HVACR PIPE

(71) Applicant: PTubes, Inc., Honesdale, PA (US)

(72) Inventor: Nicola Pilone, Clarks Green, PA (US)

(73) Assignee: PTubes, Inc., Honesdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,367

(22) Filed: Dec. 22, 2022

(65) Prior Publication Data

US 2023/0127097 A1    Apr. 27, 2023

Related U.S. Application Data

(63) Continuation of application No. 17/397,305, filed on Aug. 9, 2021, now Pat. No. 11,566,729.

(51) Int. Cl.
*F16L 9/12* (2006.01)
*B32B 1/08* (2006.01)
*F16L 9/147* (2006.01)

(52) U.S. Cl.
CPC ............... *F16L 9/123* (2013.01); *F16L 9/147* (2013.01); *B32B 1/08* (2013.01); *B32B 2307/714* (2013.01)

(58) Field of Classification Search
CPC .. F16L 9/123; F16L 9/147; B32B 1/08; B32B 2307/714
USPC ......................................................... 138/140
See application file for complete search history.

(56) References Cited

U.S. PATENT DOCUMENTS

| | | | | |
|---|---|---|---|---|
| 4,523,141 A | * | 6/1985 | Thomas | G01R 31/1263 138/104 |
| 6,358,581 B1 | * | 3/2002 | Usui | C23C 28/321 427/407.1 |
| 11,566,729 B2 | * | 1/2023 | Pilone | B32B 7/12 |
| 2003/0209279 A1 | | 11/2003 | Weibel et al. | |
| 2019/0091902 A1 | | 3/2019 | Biris et al. | |

FOREIGN PATENT DOCUMENTS

| | | |
|---|---|---|
| CA | 2643898 A1 | 5/2010 |
| CN | 202580335 U | 12/2012 |
| CN | 203363537 U | 12/2013 |
| CN | 207080712 U | 3/2018 |
| DE | 3536086 A1 | 4/1987 |
| DE | 102008022592 A1 | 11/2009 |
| EP | 896184 A2 | 2/1999 |
| IT | 102016000045706 A1 | 11/2017 |
| IT | 102019000017630 A1 | 4/2021 |
| JP | 4702273 B2 | 6/2011 |
| WO | 9637728 A1 | 11/1996 |
| WO | 2007101818 A1 | 9/2007 |

OTHER PUBLICATIONS

Request for Ex Parte Reexamination filed with the USPTO by Third Party on Nov. 9, 2024 for U.S. Pat. No. 11,566,729, Reexamination U.S. Appl. No. 90/019,698, pp. 1-35.

\* cited by examiner

*Primary Examiner* — David R Deal
(74) *Attorney, Agent, or Firm* — Tutunjian & Bitetto, P.C.

(57) ABSTRACT

The present invention relates to a pipe suitable for conveying fluids in HVACR applications, which pipe comprises an inner tube delimiting an inner space or passageway for a fluid, an insulating cover and an anti-corrosion layer.

23 Claims, 7 Drawing Sheets

HVACR PIPE

TECHNICAL FIELD

The present invention relates generally to pipes or tubes for HVACR (Heating, Ventilation, Air-Conditioning, Refrigeration) applications or systems.

In particular, the present invention relates to pipes or tubes comprising an anti-corrosion layer.

BACKGROUND

Heating, ventilation, air conditioning and refrigeration (HVACR) is the name of a technology which has greatly developed in recent years.

One of the main aims of such technology is to provide thermal comfort and acceptable indoor air quality: to obtain such results the functions of heating, ventilation, air conditioning and refrigeration are strictly interrelated.

HVACR technology finds application in residential structures, in commercial or industrial buildings, hospitals, vehicles, in marine environments, etc.

An important part of HVACR technology is constituted by pipes or tubes, which are used to convey fluids and/or gases to accomplish the HVACR purposes. Such fluids and/or gases can have a hot or cold or intermediate temperature and, in order to provide thermal insulation, the pipes or tubes are generally equipped with an insulating coating layer.

Such pipes are for example those referred to by the designation B1003-16 of the ASTM international standard.

However, when the pipes are exposed to the outdoor, pollution, such as for example heavy metals, fine dust, acid rains, or some corrosive elements or agents could cause damages.

Furthermore, during working steps and installation steps, the pipe is subject to damages and corrosive environments.

Therefore, the need is felt to provide HVACR pipes or tubes with an anti-corrosion layer or coating, in order to avoid damages and similar unwanted events or to protect the pipe from chemicals within the insulation which can cause corrosion of any kind.

Furthermore, pipes or tubes with an anti-corrosion layer or coating are needed also when they contain flammable refrigerants, in order to be safer.

SUMMARY OF THE INVENTION

The present invention discloses a pipe or tube, comprising an inner tube, especially suitable for being used in HVACR applications. In one version, the inner tube is suitable to contain at least one refrigerant for a HVACR application. On this regard, it includes an inner space or passageway through which fluids and/or gases and/or air and/or refrigerants can flow.

With the expression "refrigerants" is here to be intended fluids which are conveyed in a cooling or refrigeration circuit, and they, owing to their state change, make it possible to heat or cool other fluids or component of a thermal machine.

As a matter of fact, the inner space or passageway is a channel extending for all the length of the inner tube, with an inlet opening at one end and an outlet opening at the other end of the tube or rather of the pipe, so that a fluid inserted in the inlet opening of such inner space or passageway is conveyed through the latter until reaching the respective outlet end, where the fluid goes into a conditioning equipment, such as a VRF, minisplit, A/C unit, etc.

In one embodiment, the pipe further has at least one insulating layer, and when the pipe is pre-insulated, it is called "line set".

In some other embodiments, the pipe comprises several coating and/or insulating layers.

Advantageously, a pipe according to the present invention is suitable for connecting the external and internal unit of air conditioning machines. Such pipe can be connected to other pipes or to a component of such machines.

In some embodiments, the cross section of the pipe and/or of the inner tube is rounded and/or circular.

Advantageously, the pipe comprises an anti-corrosion layer applied on the inner tube.

Preferably, the anti-corrosion layer is tubular. Still more preferably, the anti-corrosion layer is fluid tight and not porous, for example liquid and/or gas tight. In this respect, preferably the sole openings delimited by the tubular anti-corrosion layer are at the ends of the latter.

In some embodiments, the pipe comprises an anti-corrosion layer, preferably tubular, sandwiched between the inner tube and at least one insulating layer.

In some embodiments, the pipe comprises more layers of anti-corrosion layer.

In some embodiments, the pipe comprises an insulating cover, which acts as a coating and/or insulating layer.

The insulating cover is placed above the inner tube or above the anti-corrosion layer.

The insulating cover is made of or comprises at least one of the following materials: a foam insulation material, i.e. a material undergoing an expansion under given conditions (temperature, pressure, etc.) until obtaining the final, for example sheet or tubular, shape. Optionally, the foam insulation material has a closed-cell structure.

The foam insulation material comprises or consists of for example an elastomeric and/or polyethylene foam, polyethylene (PE) or rubber, polyvinyl chloride (PVC), (acrylo) nitrile-butadiene rubber (NBR), a mixture of PVC and NBR, ethylene propylene diene monomer (EPDM), polypropylene (PP) based foam, polystyrene, polyisocyanurate, etc., a closed-cell foam, for example based on at least one polymer, such as for example PVC/NBR, NBR and EPDM, etc., a fibrous or cellular type material, cross-linked polyethylene (PEX), etc.

In some embodiments, the pipe further comprises a protective jacket. Also the protective jacket can act as coating and/or insulating layer.

The protective jacket is the outermost layer of the pipe.

In another embodiment, the protective jacket is not present.

The protective jacket can be made of at least one of the following materials: a thermoplastic elastomer (TPE) and/or TPE mixture, a thermoplastic vulcanizate (TPV), a thermoplastic polyurethane (TPU), polyethylene (PE) or plastic and/or elastomeric material, EPDM, UV-resistant EPDM, PVC, NBR, styrene butadiene rubber (SBR), cross-linked polyethylene (PEX), a mixture of at least one thermoplastic elastomer and of ethylene-propylene-diene-monomer (EPDM), or mixtures of the above or a mixture of elastomers and polymers.

The insulating cover and/or the protective jacket can have a tubular or sheet shape when it has/they have to be assembled to form the pipe.

The present invention also refers to a method of producing a pipe.

This method comprises the steps of providing an inner tube, providing an insulating cover, providing an anti-corrosion material and applying the anti-corrosion material to the inner tube, so as to obtain an anti-corrosion layer from the anti-corrosion material.

In some embodiments, the step of applying the anti-corrosion material comprises bonding, gluing, spraying, coating, applying, extruding with, heat welding, etc. the anti-corrosion material in order to obtain the anti-corrosion layer. In a preferred embodiment, the anti-corrosion layer id directly extruded on the inner tube.

In an embodiment, the insulating cover is obtained by extrusion and/or vulcanization and/or polymerization of the insulating material selected in order to make the insulating cover.

In another embodiment, the insulating cover can be inserted or applied on or around the inner tube. Therefore, the method further provides a step of inserting the inner tube, coated with the anti-corrosion layer, inside the insulating cover, if desired through a longitudinal slit made in the insulating cover, or a step of applying the insulating cover around the inner tube, coated with the anti-corrosion layer.

In an embodiment, the method comprises the steps of providing a protective material suitable to make a protective jacket, extruding the protective material in order to obtain a protective jacket on and/or over and/or all around the insulating cover.

In some embodiments, the method comprises at least one of the following steps:
knurling the protective jacket,
cooling the pipe and/or the insulating cover and/or the protective jacket and/or the anti-corrosion layer,
cutting the pipe and/or the insulating cover and/or the protective jacket to a predetermined length,
winding the pipe in a reel.

Accordingly, it is an object of the present invention to provide a pipe, suitable to be used in HVACR applications, which is resistant to corrosion.

An advantage of the present invention is to provide a pipe which is resistant to environmental elements such as temperature, humidity, UV-rays, acids, rain, snow, weather conditions, chemicals within the insulation, etc.

Another purpose of the present invention is to provide a pipe which provides good insulation, resistance to hydrolysis (resistance to hot water and steam), resistance to UV radiation and at the same time also a reasonable production price.

Still another purpose of the present invention is to provide a pipe which exhibits good resistance to bending, even at very low temperatures, as well as good resistance to abrasion.

It is an object to the present invention also to provide a method for obtaining a pipe or tube according to the above-mentioned characteristics.

DETAILED DESCRIPTION

Figure 1:
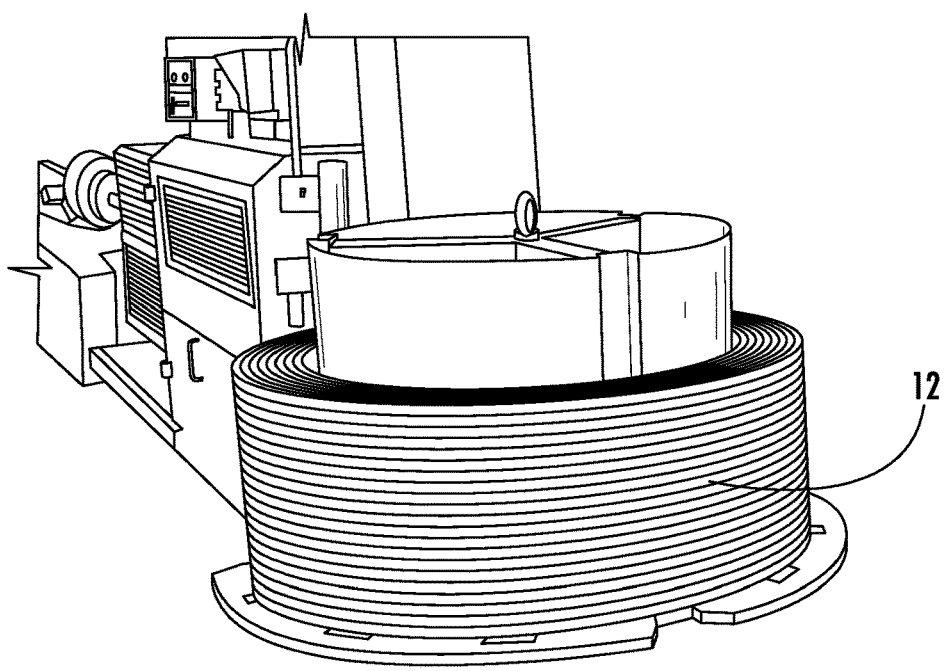
FIGS. 1-12 show each a specific method step for obtaining a pipe according to the present invention.

The present invention relates generally to a pipe or tube 10. Such pipe 10 is especially suitable to be used in HVACR applications or systems.

The pipe 10 is a composite pipe, which comprises an inner tube 12 and at least one coating and/or insulating layer.

In one embodiment of the invention, the pipe 10 comprises several coating and/or insulating layers.

The inner tube 12 is made of metal, such as copper, aluminum, stainless-steel, etc., composition or combination thereof, or of a plastic material, or of a composite material, such as for example copper and plastic (such as for example PERT, PE, PEX, PA, etc.), aluminum and plastic (such as for example PERT, PE, PEX, PA, etc.) or stainless steel and plastic (such as for example PERT, PE, PEX, PA, etc.).

Moreover, the inner tube 12 has a thickness ranging for example between 0.4 mm and 1.5 mm or between 0.6 mm to 1 mm.

In at least one embodiment of the invention, the pipe 10 is suitable for containing at least one refrigerant for a HVACR application.

With this regard, the pipe 10, and in particular the inner tube 12, defines an inner space or passageway 14 through which fluids and/or gases and/or air and/or refrigerants can flow.

As a matter of fact, the inner space or passageway 14 is a channel extending for all the length of the inner tube 12, with an inlet opening at one end and an outlet opening at the other end of the tube 12 or rather of the pipe 10, so that a fluid inserted in the inlet opening of such inner space or passageway 14 is conveyed through the latter until reaching the respective outlet end where it is discharged.

The inner tube 12 is fluid tight and not porous, for example liquid and/or gas tight, since it should prevent the leakage of fluid through its wall/s. In this respect, the sole openings delimited by the inner tube 12 are at the ends of the latter.

In one version of the invention, the cross section of the pipe 10 and/or of the inner tube 12 is rounded and/or circular or oval or regular polygon-shaped or irregular polygon-shaped. This means that at least the outer cross section of the pipe 10 and/or of the inner tube 12 has the mentioned shape, considering that "outer" in the present invention means the area opposite the innermost area of the pipe. The innermost area of the pipe can correspond to the inner space or passageway 14.

Of course, even the inner cross-section of the inner tube 12 can have a regular polygonal, irregular polygonal or circular or oval cross-section or any other suitable cross-section.

The pipe 10 comprises an anti-corrosion layer 16. Advantageously, the anti-corrosion layer 16 protects the inner tube 12 and/or generally the pipe 10 from environmental elements such as temperature, humidity, UV-rays, acids, rain, snow, weather conditions, chemicals inside the insulation, etc.

According to a version of the invention, the anti-corrosion layer 16 is in contact, preferably continuously or with no discontinuity and for its whole extension, with the inner tube 12.

According to a version of the invention, the anti-corrosion layer 16 can be placed in an outer position with respect to the inner space or passageway 14 of the pipe 10.

The anti-corrosion layer 16 is made of or comprises at least one of the following materials: polyvinyl chloride (PVC) or polyethylene (PE) or polyamide (PA), polyethylene of raised temperature (PERT), cross-linked polyethylene (PEX) based polymers, or mixture thereof.

Furthermore, the anti-corrosion layer 16 has a thickness of about 0.05 mm up to 5 mm, for example between 0.1 mm to 1.5 mm or of about 1 mm or of about 2 mm or between 0.1 mm to 1 mm or between 0.2 mm and 0.9 mm, or between 0.2 mm and 0.8 mm or about 0.5 mm, etc. In one version of the invention, the anti-corrosion layer 16 is completely in contact with the inner tube, i.e., for example the whole inner surface of the anti-corrosion layer is in contact with the whole outer surface of the inner tube 12.

Figure 14:
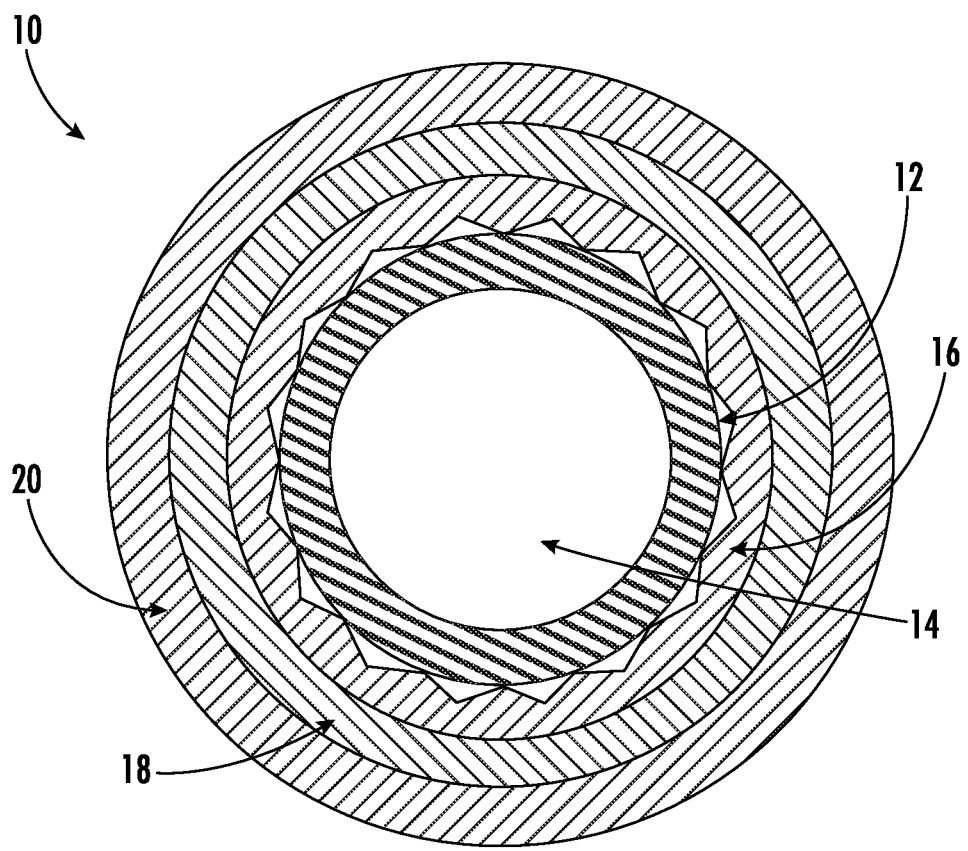
FIG. 14 is a cross-sectional view of another embodiment of a pipe according to the present invention.

In another version, for example shown in FIG. 14, the anti-corrosion layer 16 is only at least in contact with the inner tube, i.e., for example the inner surface of the anti-corrosion layer 16 is irregular, or wrinkled, or it has ridges and valleys, and therefore it is only in part in contact with the outer surface of the inner tube 12, which in turn is smooth. Please not that FIG. 14 is not in scale, as its aim is to make visible a possible detail of the present invention.

In this version, it is possible, for the anti-corrosion layer, to better adapt to the dilatation and/or the shrinkage of the inner tube due to temperature variation from hot to cold.

When the anti-corrosion layer 16 is provided between the insulating cover 18 and the inner tube 12, the cover 18 has the function of protecting the anti-corrosion layer too. The advantage of such kind of protection layer is that, when it is inside the pipe 10, i.e. in contact with the inner tube 12, it is able to protect from corrosion the inner tube 12 itself, also during the processing or production steps to which the inner tube 12 is subjected to.

Therefore, in one version of the invention, when the insulating cover 18 is present, the pipe 10 is a pre-insulated pipe.

Obviously, if the pipe or a respective layer undergoes a corrosion, unwanted losses of gas and/or fluid and/or air and/or refrigerant can occur, with consequent damages and reduced efficiency for the entire HVACR application.

In this case, a big issue arises in terms of environment, because losses can be toxic or dangerous or harmful to the environment, in terms of safety, as for example new refrigerants are flammable, and also for the lifespan of the tube or the pipe, and pollution and contamination can cause damages to such elements.

Furthermore, as indicated hereinbelow, the inner tube 12 can have or not a protective jacket, and therefore the presence of at least one anti-corrosion layer ensures a higher resistance for these elements.

In at least one embodiment of the invention, the pipe 10 comprises an insulating cover 18. The insulating cover 18 is an example of coating and/or insulating layer of the pipe 10.

The insulating cover 18 can be in contact, preferably continuously or with no discontinuity and for its whole extension, with the anti-corrosion layer 16. This happens because the anti-corrosion layer 16 is placed in contact with the inner tube 12. In such a case, the insulating cover 18 is in contact with an outer surface of the anti-corrosion layer 16.

The tubular insulating cover 18 covers or encloses the inner tube 12 for the whole length or longitudinal extension of the latter.

The insulating cover 18 is made of or comprises at least one of the following materials: a foam insulation material, i.e. a material undergoing an expansion under given conditions (temperature, pressure, etc.) until obtaining the final tubular or sheet shape. Optionally, the foam insulation material has a closed-cell structure.

The foam insulation material comprises or consists of for example an elastomeric and/or polyethylene foam, polyethylene (PE) or rubber, polyvinyl chloride (PVC), (acrylo) nitrile-butadiene rubber (NBR), a mixture of PVC and NBR, ethylene propylene diene monomer (EPDM), polypropylene (PP) based foam, polystyrene, polyisocyanurate, etc., a closed-cell foam, for example based on at least one polymer, such as for example PVC/NBR, NBR and EPDM, etc., a fibrous or cellular type material, cross-linked polyethylene (PEX), etc.

In the present patent document, the verb "consist" means "include only", whereas this is not the case of the verb comprise or include.

Furthermore, the insulating cover 18 has a thickness ranging for example between ½ in and 1 in. Preferably, the thickness of the insulating cover 18 is constant from one end to the other of the cover 18.

The insulating cover 18 has the function of protecting the inner tube 12 and/or the anti-corrosion layer 16.

The inner and outer cross sections of the insulating cover 18 can be suitably shaped, for example one or both of them (inner and outer cross sections) can have a regular polygonal, irregular polygonal or circular or oval or round cross-section. Preferably, the shape and size of inner cross-section of the cover substantially corresponds to or rather are slightly higher than the shape and size of the outer cross-section of the inner tube 12.

Furthermore, it ensures, in addition to good insulation, resistance to hydrolysis (resistance to hot water and steam), resistance to UV radiation and at the same time also a reasonable production price.

In another embodiment of the present invention, the pipe 10 can comprise also a protective jacket 20. The protective jacket 20 is an example of a coating and/or insulating layer of the pipe 10.

The protective jacket 20 can be the outermost layer of the pipe 10.

According to another version, the protective jacket 20 can cover the anti-corrosion layer 16, if the insulating cover 18 is not present.

According to another embodiment, in which the anti-corrosion layer 16 is placed in contact with the inner tube 12, the protective jacket 20 is not in contact with the anti-corrosion layer 16. In this case it can be in contact, preferably continuously or with no discontinuity and for its whole extension, with the insulating jacket 18.

Advantageously, no glue is provided between the tubular jacket 20 and the tubular insulating cover 18, since the same layers are constrained or connected to one another owing to the obtainment step of the tubular jacket 20 over or around the tubular insulating cover 18 (such as for example obtained owing to the knurling described below).

The protective jacket 20 can be made of at least one of the following materials: a thermoplastic elastomer (TPE) and/or TPE mixture, a thermoplastic vulcanizate (TPV), a thermoplastic polyurethane (TPU), polyethylene (PE) or plastic and/or elastomeric material, EPDM, UV-resistant EPDM, PVC, NBR, styrene butadiene rubber (SBR), cross-linked polyethylene (PEX), a mixture of at least one thermoplastic elastomer and of ethylene-propylene-diene-monomer (EPDM), or mixtures of the above or a mixture of elastomers and polymers.

If desired, the material for the obtainment of the protective jacket 20 contains at least one suitable additive, such as for example UV or weather retardants, slipping agents, fire or smoke retardants, anti-microbial agents, colors, etc.

Furthermore, the protective jacket 20 has a thickness ranging for example between 0.2 mm and 2 mm Preferably, the thickness of the jacket 20 is constant from one end to the other thereof.

The insulating cover 18 and/or the protective jacket 20 can be provided in tubular or sheet shape, when it has/they have to be assembled to form the pipe 10.

The protective jacket 20 acts as protective sheath, since it provides resistance to bending, even at very low temperatures, as well as good resistance to abrasion.

According to one version of the invention, as the inner tube 12 has a tubular shape, possible with circular or with another shape cross-section, also the anti-corrosion layer 16, the insulating cover 18 and/or the protective jacket 20 can have a tubular shape. In fact, they are—directly or indirectly—placed or applied on the outer tubular surface of the inner tube 12 and therefore have the same or comply with the shape and cross section of the inner tube 12.

The protective jacket 20 can be not porous and fluid tight, although its main role is not that of preventing the leakage of fluid through its walls.

The inner and outer cross sections of the protective jacket 20 can be suitably shaped, for example one or both of them (inner and outer cross sections) can have a regular polygonal, irregular polygonal or circular or oval or round cross-section. Preferably, the shape and size of inner cross-section of the jacket 20 substantially corresponds or are slightly higher than the shape and size of the outer cross-section of the cover 18.

According to an embodiment of the invention, the pipe 10 is a flexible pipe. Furthermore, as disclosed above, it is a composite pipe, as it comprises at least one or two coatings applied outwardly with respect to its inner space or passageway 14.

As already indicated, according to an embodiment of the invention, the anti-corrosion layer 16 is applied on the inner tube 12.

This means that the anti-corrosion layer 16 is bonded to, glued with, sprayed on, coated on, applied to, extruded with, heat welded to, etc. the inner tube 12.

In this respect, when glue is used, the glue could be for example a LLDPE or ULDPE based polymers with polar bonding agents.

According to one version of the invention, the application of the anti-corrosion layer 16 occurs without the use of glue or other suitable adhesives.

In addition to the anti-corrosion layer 16, it is possible to list several preferred embodiments of pipe according to the present invention, which the inventors experimented to provide the best performance.

A first preferred embodiment of pipe according to the present invention has a tubular insulating cover made of an insulation material comprising or consisting of a mixture of PVC and NBR, a protective jacket made of a mixture of at least one thermoplastic elastomer and of EPDM, and with glue or adhesive between the protective jacket and the insulating cover, so that such tubular layers are constrained or connected or bonded to one another by glue or adhesive.

In accordance with a second preferred embodiment of pipe according to the present invention, the insulation material of the insulating cover comprises or consists of a mixture of PVC and NBR, the protective jacket is made of at least one thermoplastic elastomer, preferably with no EPDM mixed therewith, and with no glue or adhesive provided between the jacket and the cover, and thus such tubular layers are not constrained or connected or bonded to one another by glue or adhesive.

In connection instead with a third preferred embodiment of pipe according to the present invention, the insulation material comprises or consists of a mixture of PVC and NBR, the protective jacket is made of at least one thermoplastic elastomer, preferably with no EPDM mixed therewith, and glue or adhesive is also provided between the jacket and the cover, so that such tubular layers are constrained or connected or bonded to one another by glue or adhesive.

A fourth preferred embodiment of pipe according to the present invention has instead a tubular insulating cover made of an insulation material comprising or consisting of EPDM, a protective jacket made of a mixture of at least one thermoplastic elastomer and of EPDM, and no glue or adhesive is provided between said tubular jacket and said tubular insulating cover, and thus such layers are not constrained or connected or bonded to one another by glue or adhesive.

Referring now to a fifth preferred embodiment of pipe according to the present invention, the insulation material comprises or consists of EPDM, the protective jacket is made of a mixture of at least one thermoplastic elastomer and of EPDM, and glue or adhesive is provided between the jacket and the cover, and thus such tubular layers are constrained or connected or bonded to one another by glue or adhesive.

In accordance with a sixth preferred embodiment of pipe according to the present invention, the insulation material comprises or consists of EPDM, the protective jacket is made of at least one thermoplastic elastomer, preferably with no EPDM mixed therewith, and no glue or adhesive is provided between the jacket and the cover, and thus such tubular layers are not constrained or connected or bonded to one another by glue or adhesive.

With reference then to a seventh preferred embodiment of pipe according to the present invention, the insulation material comprises or consists of EPDM, the protective jacket is made of at least one thermoplastic elastomer, preferably with no EPDM mixed therewith, and glue or adhesive is provided between the jacket and the cover, and thus such tubular layers are constrained or connected or bonded to one another by glue or adhesive.

The subject matter of the present invention further relates to a method of producing or of obtaining a pipe or tube 10.

Figure 3:
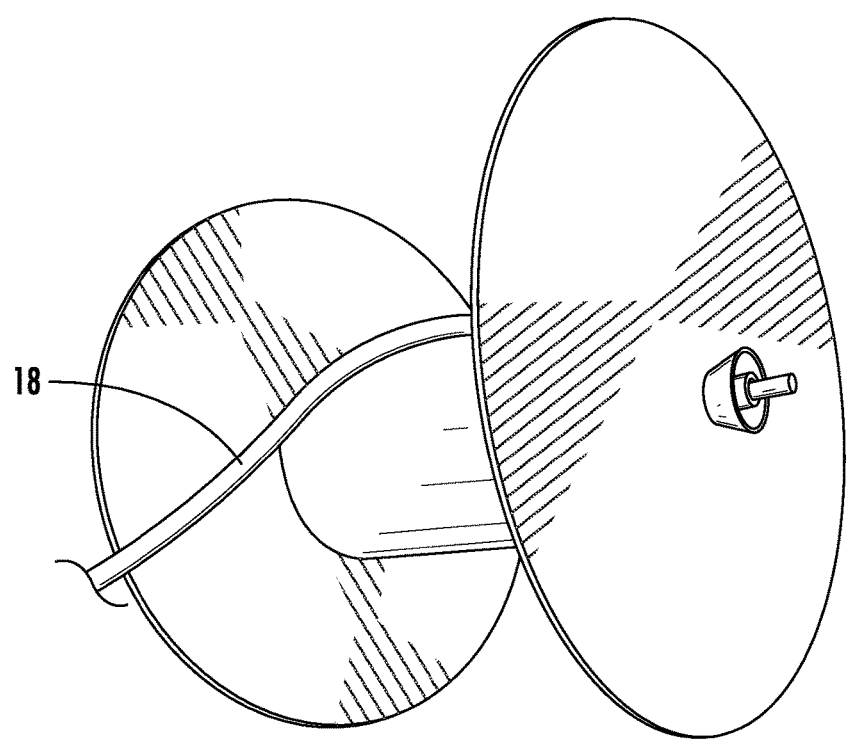

This method comprises the following steps.

providing an inner tube 12 (this method step is for example shown in FIG. 1), for example unwinding it from a respective reel, providing an insulating cover 18 (this method step is for example shown in FIG. 3), for example unwinding it from a respective reel or obtaining it from a respective container, providing an anti-corrosion material and applying the anti-corrosion material to the inner tube 12, obtaining an anti-corrosion layer 16 from the anti-corrosion material.

Figure 2:
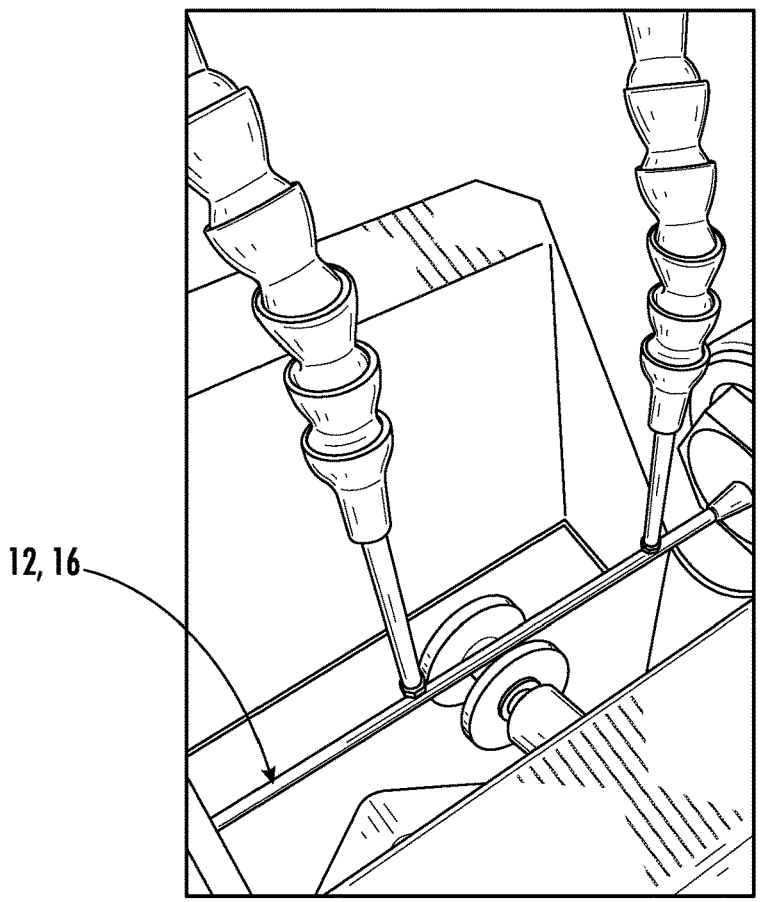

In order to obtain the anti-corrosion layer, after the application of the material, the inner pipe, coated with the anti-corrosion layer, is cooled with water drop (as shown in FIG. 2) or spray.

The step of applying the anti-corrosion material comprises bonding, gluing, spraying, coating, applying, extruding with, heat welding, etc. the anti-corrosion material in order to obtain the anti-corrosion layer 16. In a preferred embodiment, the anti-corrosion material is extruded on the inner tube, in order to obtain a strict adhesion of the anti-corrosion material on the inner tube.

The extrusion can be a linear extrusion or a cross-die extrusion, i.e. in a cross direction with respect to the direction of progress of the tube.

The anti-corrosion layer 16 has both the function to protect the inner tube 12 and to avoid leakages of fluids from the latter.

The insulating cover 18 can be obtained by extrusion and/or vulcanization and/or polymerization of the insulating material selected in order to make the insulating cover 18. In another embodiment, the insulating cover 18 can be inserted or applied on or around the inner tube 12. Therefore, the method further provides a step of inserting the inner tube 12, coated with the anti-corrosion layer 16, inside the insulating cover 18, or a step of applying the insulating cover 18 around the inner tube 12, coated with the anti-corrosion layer 16.

Of course, means of guiding the inner tube 12 and the insulating cover 18 as well as the other components for obtaining a pipe along the line are provided in the latter.

This is possible because, for example, the method comprises a step of longitudinally cutting, for example through a suitable saw 8, such as a circular saw, the insulating cover 18, thereby defining a slit 18*a* therein and a step of inserting the inner tube 12 in the slit of the insulating cover 18.

Figure 4:
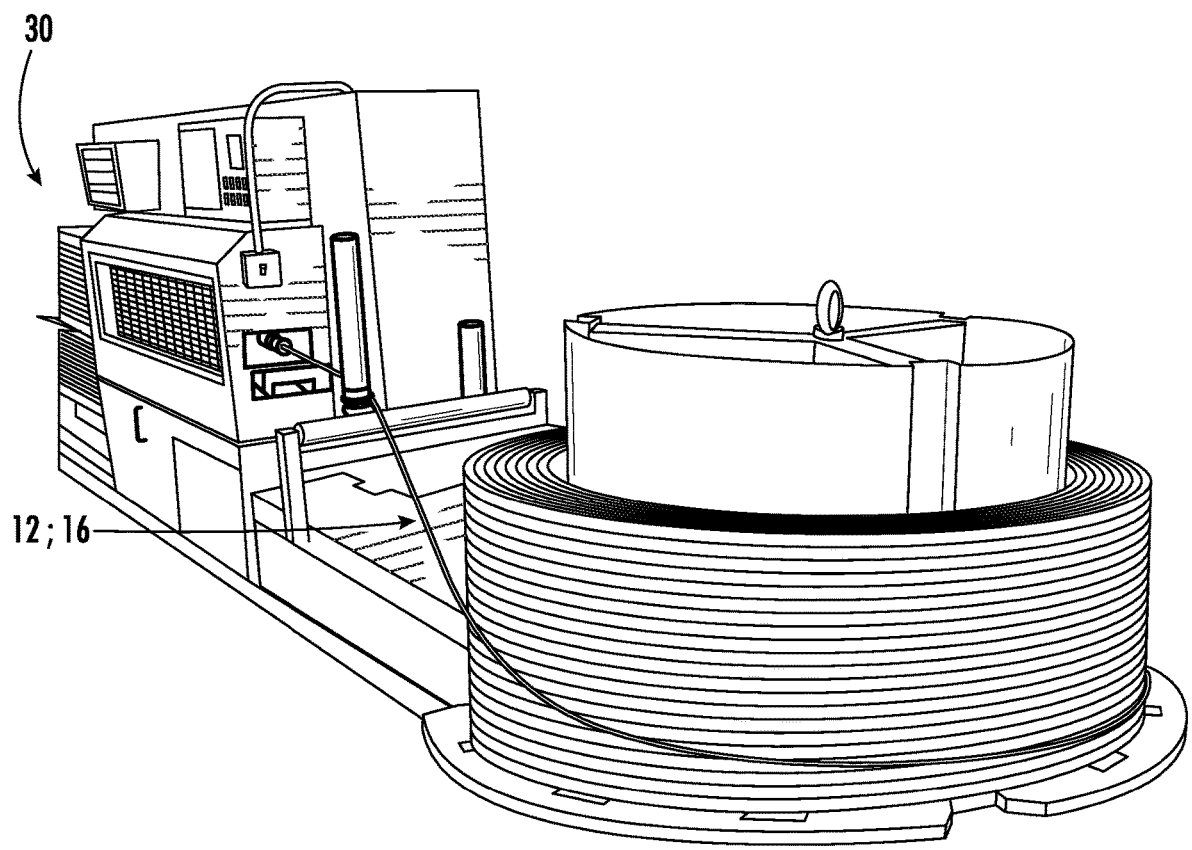
Figure 5:
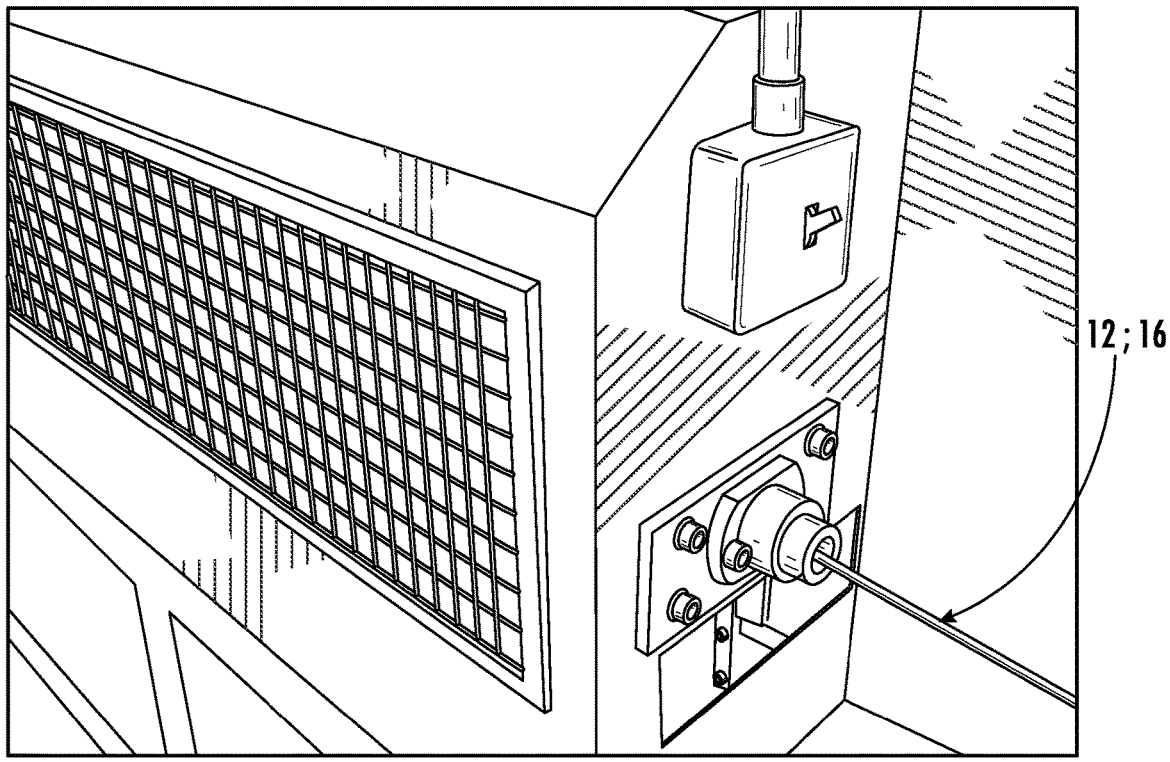
Figure 6:
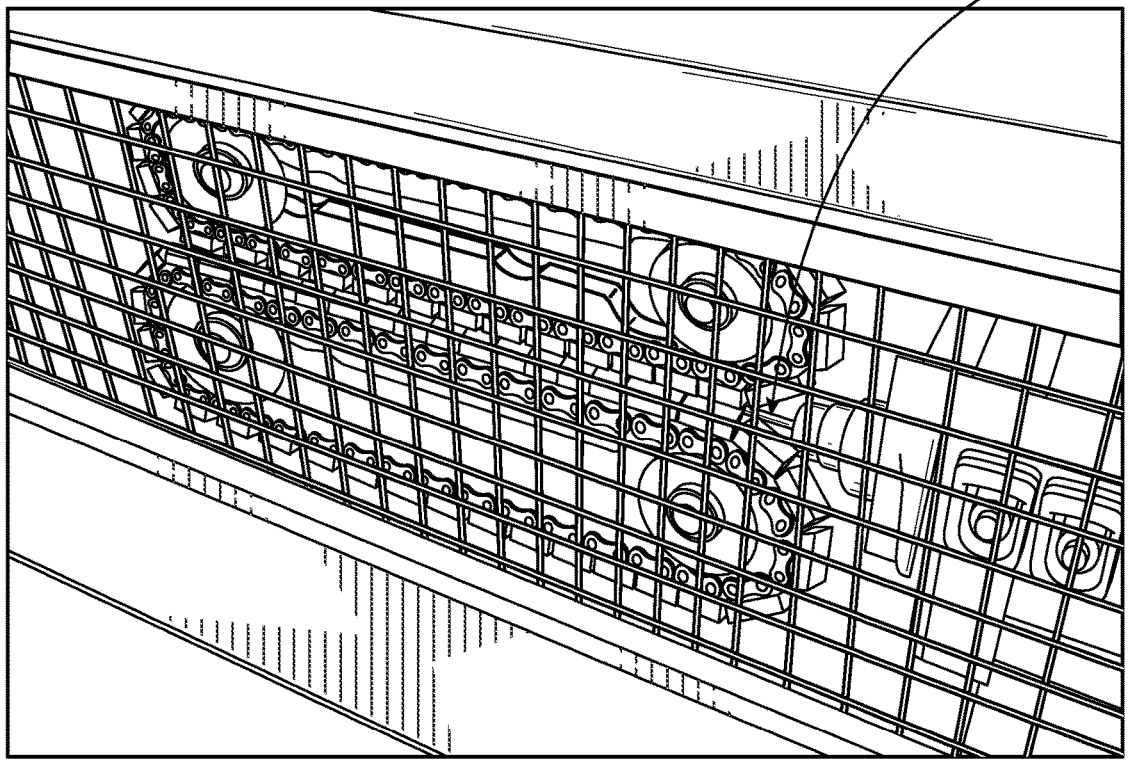
Figure 7:
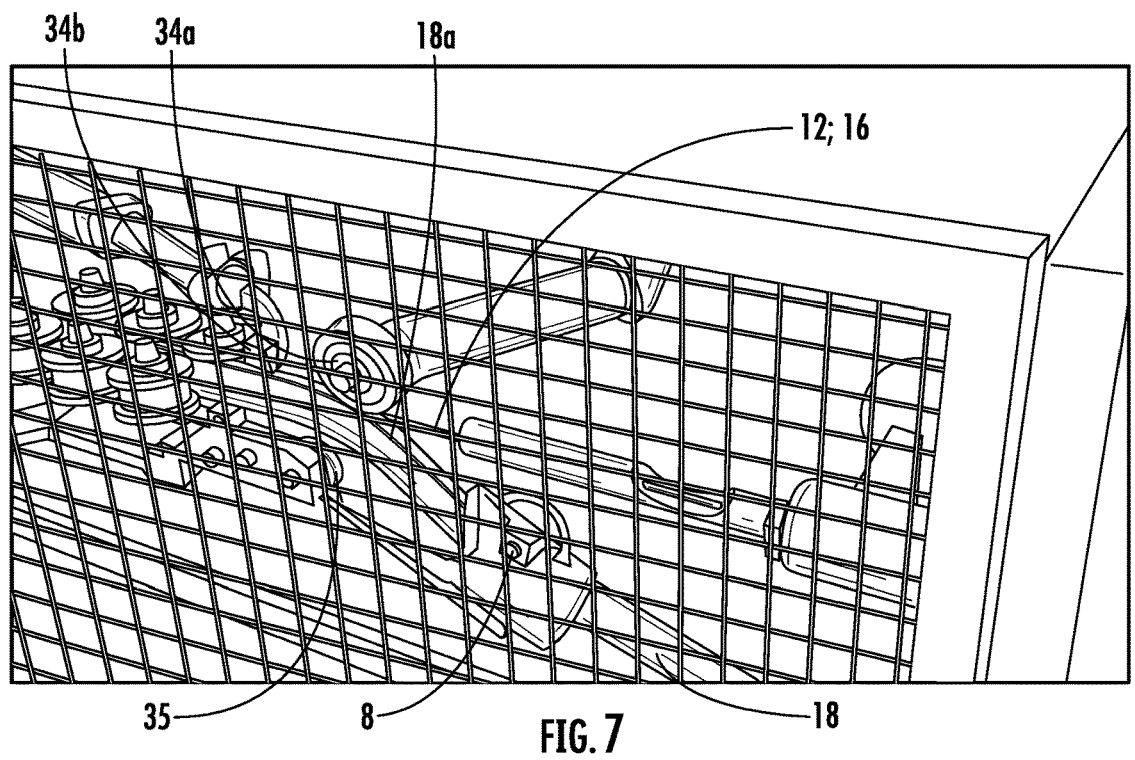

FIGS. 4 to 6 show such method steps, wherein the inner tube 12 is fed to a coating machine 30 which forces the inner tube 12 along a predetermined pathway, according to which (as shown in FIG. 7) the inner tube 12 is drawn close to the insulating cover 18 and guided through the respective longitudinal slit 18*a*, so as to enter the longitudinal opening of the insulating cover 18.

Optionally, enhancing means 34*a*, 34*b* will enhance the insertion of the inner tube 12 inside the slit 18*a* enlarging the slit 18*a*. The enhancing means can include a roller or rotating bearing 34*a* and/or a wedge 34*b*. In particular, the roller or rotating bearing 34*a* or wedge 34*b* of the enhancing means can comprise an end or portion suitable to be inserted inside the slit 18*a*, so that such roller or rotating bearing or wedge enlarges the slit 18*a*, thereby rendering it possible for the tube 12 to enter the same 18*a*.

Advantageously, the insulating cover 18 guided through the line for obtaining a pipe 10, is bent by bending means, for example including rollers 35 or the like, at the station of the line where the tube 12 is inserted into the cover 18.

In this respect, owing to the action of the bending means, the cover 18 advancing in the line is caused to deviate from a first direction, for example inclined with respect to the horizontal to a second direction, for example horizontal, inclined with respect to the first direction, for example by an angle ranging among 20° and 80°.

In such case, the tube 12, is drawn along a direction substantially parallel to the second direction, at least at the station of the line where the tube 12 is inserted into the cover 18, and it (the tube 12) is inserted through the slit 18*a* at the point or portion of the line where the deviation of the cover 18 occurs.

As it will be understood, the deviation optionally imparted on the cover 18, in combination with the guiding direction of the tube 12 with the optional proviso of enhancing means 34*a*, 34*b*, determines an easy and rapid insertion of the latter inside the cover 18.

If the insulating cover 18 is to be cut and not directly obtained with a slit, as said a suitable cutter or saw can be provided in the line, preferably upstream of the optional enhancing means 34*a*, 34*b* and/or of the means for deviating the cover 18.

Moreover, the cutter has for example the shape of a rotating or fixed blade able to obtain the through slit 18*a* in the cover 18. Obviously, the cutter has a predetermined size, suitable for cutting the whole thickness of the wall of the insulating cover 18.

In this respect, the slit 18*a* has a depth corresponding to the thickness of the insulating cover 18, from the outermost surface thereof till its inner hole or cavity.

Figure 8:
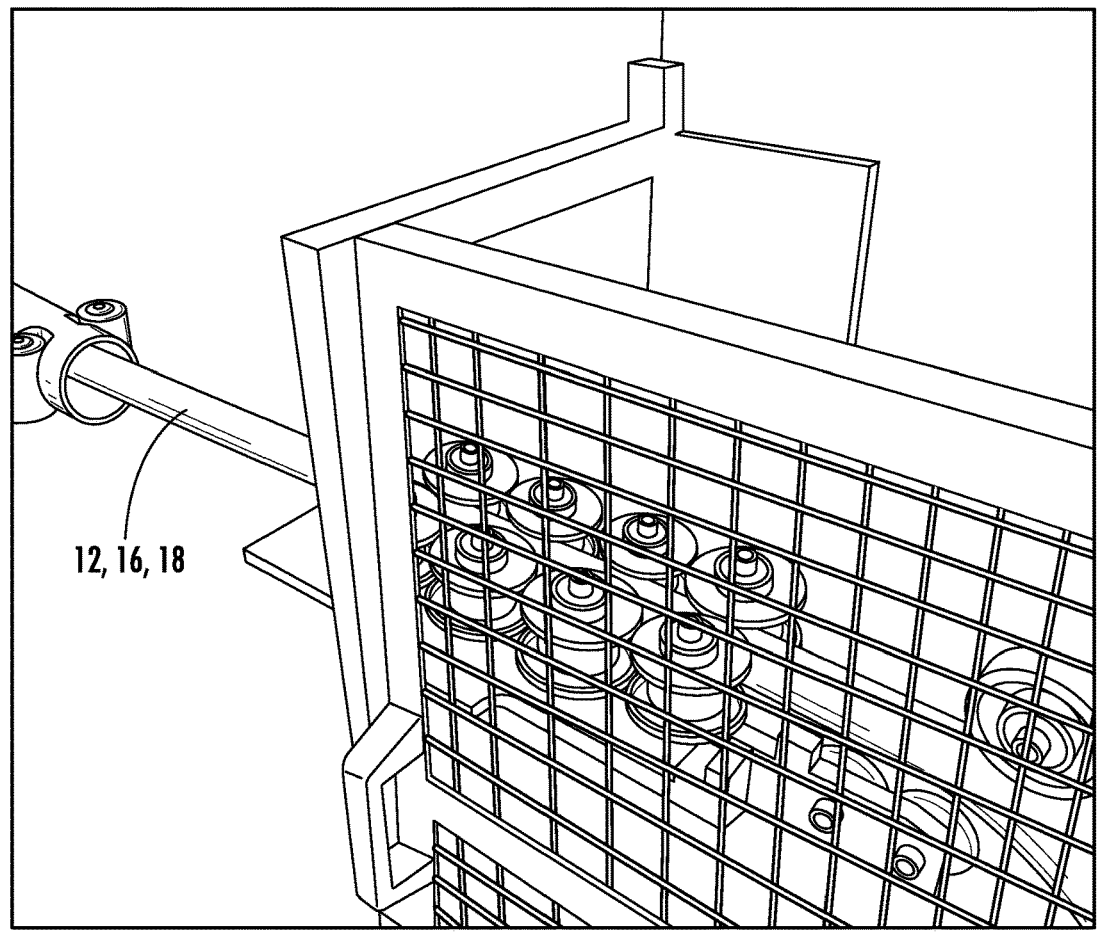

As shown in FIG. 8, after the inner tube 12, coated with the anti-corrosion layer 16, has been inserted inside the insulating cover 18, a step of closing the slit 18*a* is present. Such closing step can be performed by welding for example by hot air or UV rays (mainly when PE is used) or gluing (mainly when rubber is used) with a suitable nozzle the insulating cover 18 at the slit 18*a*.

As an alternative, the cover 18 is provided with a slit, and with an adhesive layer suitably covered by a non-adhesive layer arranged at the edges of the cover 18 delimiting the slit; in such case, after the inner tube 12 has been inserted into the cover through the slit, the non-adhesive layer is removed so that the adhesive layers will adhere to each other closing the slit.

Figure 9:
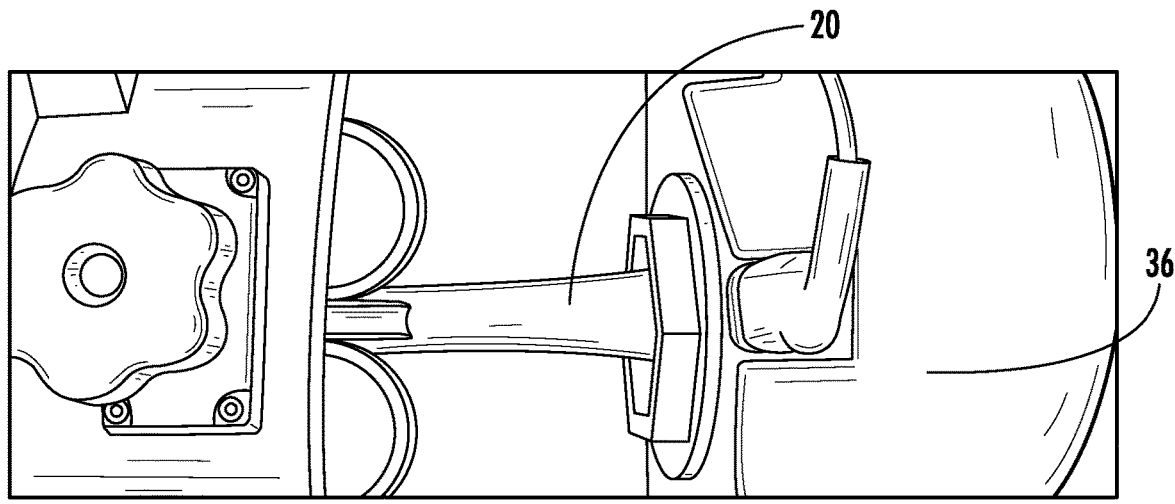

As shown for example in FIG. 9, according to an embodiment of the invention, it is possible for the method to comprise the following steps, before or after the step of inserting the inner tube inside the insulating cover or applying the tubular insulating cover around the inner tube:

providing a protective material suitable to make the protective jacket 20, extruding the protective material in order to obtain a protective jacket 20 on and/or over and/or all around the insulating cover 18. This is accomplished for example by means of cross hear extruder 36, i.e. an extruder extending in a direction orthogonal to the advancement direction of the pipe in the line, or with another suitable machine of the line.

Otherwise, the protective jacket can be provided in tubular shape and then coupled with the tubular insulating cover 18.

Optionally, a layer of glue is supplied among the insulating cover 18 and the protective jacket 20. This step can be carried out with a co-extruder suitable for extruding both the glue and the protective jacket.

In this respect, a suitable extruder for the protective jacket 20 and, optionally for the glue can be used, for example a die extruder with cross head or another suitable extruder.

As an alternative, the protective jacket 20 can be obtained with a sheet shape and the same is coupled (with glue or not) with or abutted to a sheet of insulating cover 18, and subsequently such coupled layers 18, 20 are folded so as to obtain a tubular insulating cover with an outer tubular protective jacket, and the free ends of the tubular cover+ jacket are fixed to one another by means of glue or welding. Thus, in such case, the protective jacket 20 would not be applied or obtained on or around a tubular cover, but such components, cover 18 and jacket 20, would be rendered tubular starting from a sheet together and simultaneously.

Figure 10:
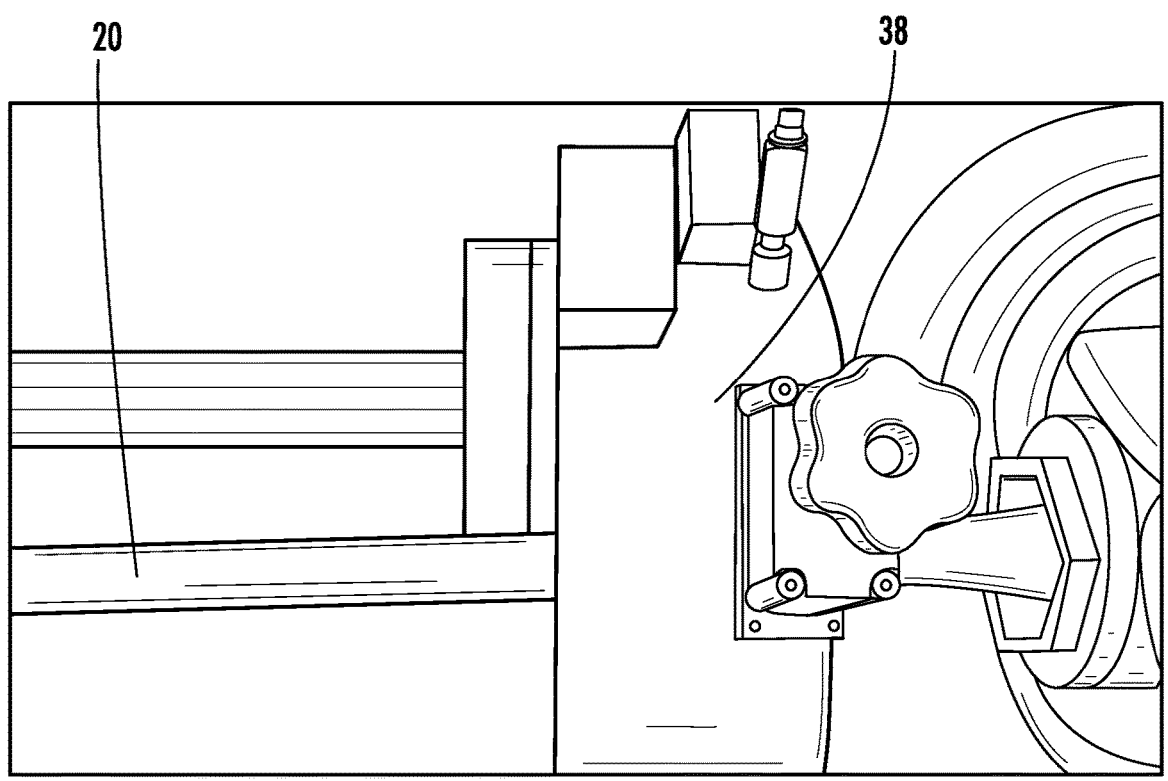

After that, as shown in FIG. 10, the method can comprise a step of knurling the protective jacket 20. This is made by a shaping machine 38, which comprises for example suitable tools for impressing or shaping the outer surface of the protective jacket 20.

Figure 11:
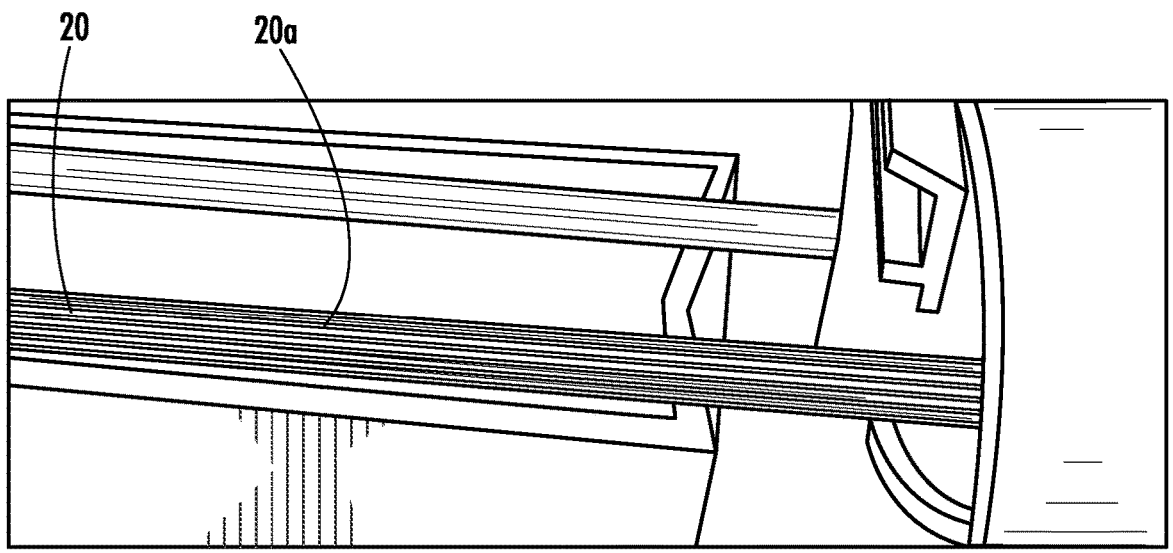

In this way, the outer surface of the protective jacket 20 has a knurled or waved or rough pattern or corrugations or with other patterns or corrugations, such as a longitudinal pattern or corrugations 20*a* or with an annular rings pattern or corrugations (referred to in FIG. 11).

Such a treatment of the protective jacket 20 could also be of help for improving the bond or constrain among the insulating cover 18 and the protective jacket 20.

As an alternative, the tube 12 and the cover 18 are obtained, with the cover 18 having no slit and with no cutter being arranged, and the protective jacket 20 is applied around the cover 18 before the same is applied to the tube 12. At this stage, the tube 12—covered by the anti-corrosion layer 16—is inserted into the longitudinal opening of the tubular cover 18 coated with tubular jacket 20. In this case, specific expedients should be provided for ensuring a proper bonding of the tube 12 and the cover 18.

In this case, as it will be understood, the thermal insulation is improved owing to the fact that no slit is arranged and subsequently closed.

However, a method as previously described (with a cover delimiting a slit for the inner tube insertion) makes it possible to obtain pipes longer than the now recalled second alternative, since when an inner tube 12 is inserted into an insulating cover 18 as in the latter case, the tube 12 is subjected to a stress higher than the case with the cover delimiting a slit.

Moreover, the first method described for inserting the inner tube 12 in an insulating cover 18 ensures an improved adhesion among such layers.

In this way, it is possible to obtain the final pipe 10.

Figure 12:
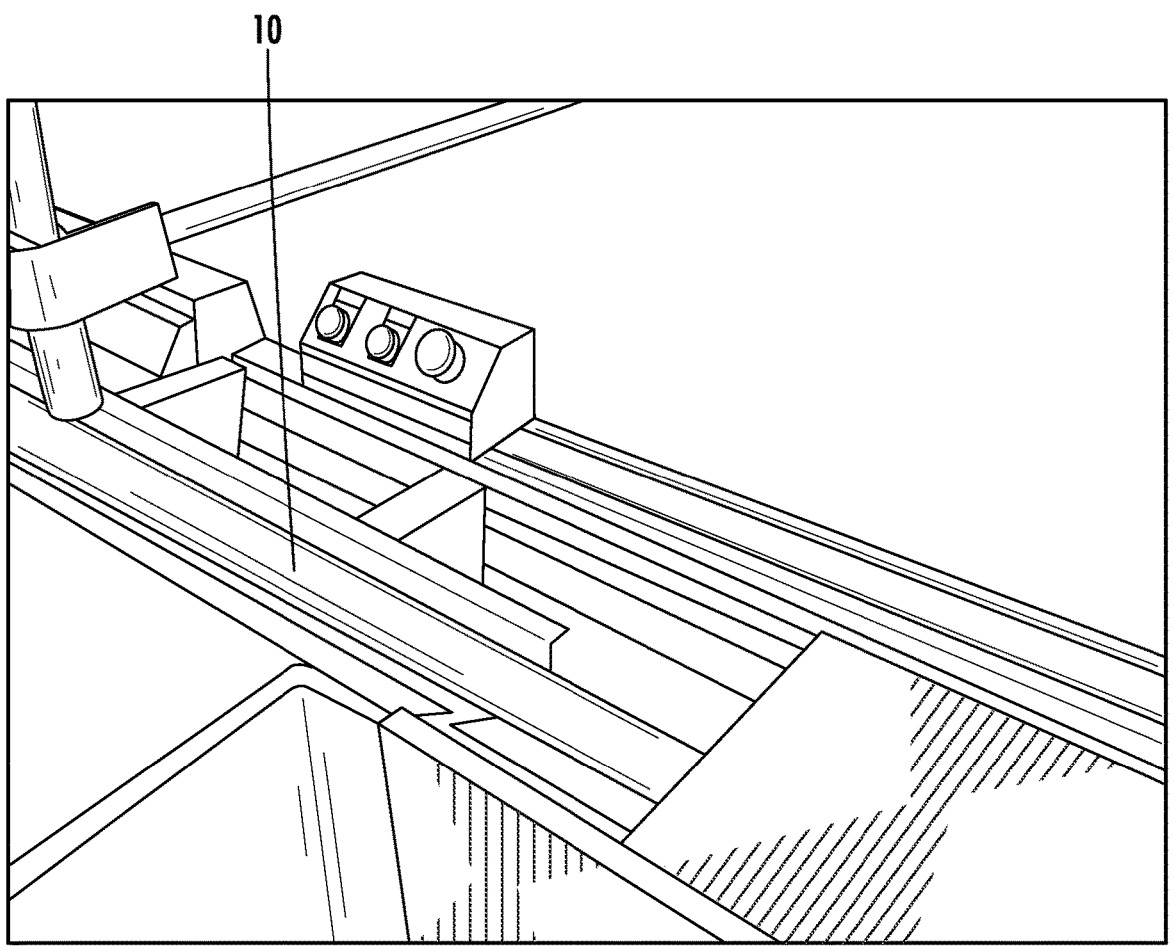
Figure 13:
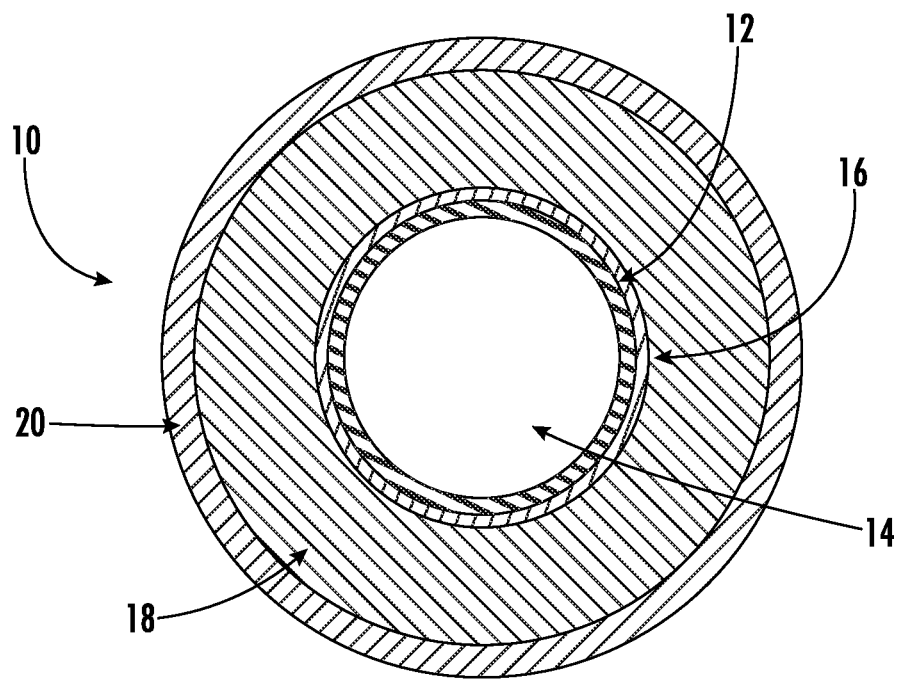
FIG. 13 is a cross-sectional view of an embodiment of a pipe according to the present invention.

After the pipe 10 has been wholly obtained, i.e. all its layers and/or coatings have been applied, some further steps can be present:
cooling the pipe 10 (as shown in FIG. 12) and/or the protective jacket 20 and/or the insulating cover 18 and/or the anti-corrosion layer 16, and/or
marking the pipe with any suitable marking, and/or
cutting the pipe 10 and/or the inner tube 12 and/or the insulating cover 18 and/or the protective jacket 20 to a predetermined length, for example of 10 ft up to 200 ft, and/or
winding the pipe 10 in a reel.

As can be understood, the present invention provides advantages over known prior art.

It will be understood that various details of the present invention may be changed without departing from the scope of the present specification. Furthermore, the foregoing description is for the purpose of illustration only, and not for the purpose of limitation.

The invention claimed is:

1. A pipe for conveying fluids in HVACR applications, said pipe consisting of:
an inner tube delimiting an inner space or passageway for a fluid;
an insulating cover; and
an anti-corrosion layer;
said inner tube being made of a metal, comprising at least one of copper, aluminium, stainless steel, or of a plastic material,
wherein said anti-corrosion layer is at least in part in contact with an outer surface of the metal or plastic inner tube, and wherein the anti-corrosion layer is extruded directly on the outer surface of the metal or plastic inner tube without the use of glue or other adhesives,
wherein said anti-corrosion layer is made of or comprises at least one of the following materials: polyvinyl chloride (PVC) or polyethylene (PE) or polyamide (PA), polyethylene of raised temperature (PERT), cross-linked polyethylene (PEX) based polymers, or mixture thereof, and
wherein the anti-corrosion layer has a thickness of between 0.1 mm to 1 mm.

2. The pipe according to claim 1, wherein said anti-corrosion layer is extruded on the inner tube.

3. The pipe according to claim 1, wherein said anti-corrosion layer has a thickness of about 0.05 mm up to 5 mm.

4. The pipe according to claim 1, wherein said inner tube is a composite pipe comprising at least one of copper and plastic, aluminum and plastic or stainless steel and plastic, and wherein said inner tube has a thickness ranging between 0.4 mm and 1.5 mm.

5. The pipe according to claim 1, wherein said inner space or passageway is a channel all along the inner tube, through which fluids and/or gases and/or air and/or refrigerants of the HVACR application can flow.

6. The pipe according to claim 1, wherein the pipe has a rounded and/or circular or oval or regular polygon-shaped or irregular polygon-shaped cross section and wherein said pipe and said anti-corrosion layer is tubular shaped.

7. The pipe according to claim 1, wherein said insulating cover is made of at least one of the following materials: a foam insulation material, and/or a material undergoing an expansion under given conditions, including an elastomeric and/or polyethylene foam, polyethylene (PE) or rubber, polyvinyl chloride (PVC), acrylonitrile-butadiene rubber (NBR), a mixture of PVC and NBR (PVC/NBR), ethylene propylene diene monomer (EPDM), polypropylene (PP) based foam, polystyrene, polyisocyanurate, a closed-cell foam, based on at least one polymer, such as for example PVC/NBR, NBR and EPDM, a fibrous or cellular type material, a mixture of at least one thermoplastic elastomer and of ethylene-propylene-diene-monomer (EPDM), and cross-linked polyethylene (PEX).

8. The pipe according to claim 1, wherein said insulating cover is at least in part in contact with an outer surface of said anti-corrosion layer and/or with an outer surface of the inner tube.

9. The pipe according to claim 1, wherein said pipe comprises a protective jacket.

10. The pipe according to claim 9, wherein said protective jacket is the outermost layer of the pipe.

11. The pipe according to claim 9, wherein said protective jacket is made of at least one of the following materials: a thermoplastic elastomer (TPE) and/or TPE mixture, a thermoplastic vulcanizate (TPV), a thermoplastic polyurethane (TPU), polyethylene (PE) or plastic and/or elastomeric material, EPDM, UV-resistant EPDM, PVC, NBR, styrene butadiene rubber (SBR), cross-linked polyethylene (PEX), a mixture of at least one thermoplastic elastomer and of EPDM, or a mixture of elastomers and polymers or mixtures of the above, and/or wherein said protective jacket further comprises at least one additive, including UV or weather retardants, slipping agents, fire or smoke retardants, anti-microbial agents, colors.

12. The pipe according to claim 9, wherein said insulating cover and said protective jacket has a rounded and/or circular or oval or regular polygon-shaped or irregular polygon-shaped cross section and wherein said pipe and/or said inner tube and/or said anti-corrosion layer is tubular shaped.

13. The pipe of claim 1, wherein the anti-corrosion layer has a thickness of between 0.2 mm to 0.8 mm.

14. A method for obtaining a pipe for conveying fluids in HVACR applications, comprising:
providing an inner tube delimiting an inner space or passageway for a fluid, an insulating cover and an anti-corrosion layer, said inner tube consisting of an untreated metal, comprising at least one of copper, aluminium, stainless steel, or of a plastic material;

extruding an anti-corrosion material on at least one portion of an outer surface of the untreated metal or plastic inner tube without the use of glue or other adhesives to form an anti-corrosion layer thereon; and at least one of inserting the inner tube coated with the anti-corrosion layer inside an insulating cover, or applying the insulating cover around the inner tube coated with the anti-corrosion layer, wherein said anti-corrosion layer comprises at least one of the following materials: polyvinyl chloride (PVC) or polyethylene (PE) or polyamide (PA), polyethylene of raised temperature (PERT), cross-linked polyethylene (PEX) based polymers, or mixture thereof.

15. The method according to claim 14, comprising the steps of longitudinally cutting the insulating cover, thereby defining a longitudinal slit therein and of inserting the inner tube in the slit of the insulating cover.

16. The method according to claim 15, wherein said inserting step comprises feeding to a coating machine the inner tube, enlarging the slit by means of enhancing means and inserting the inner tube inside the longitudinal slit, in order to insert all along the inner tube inside the insulating cover.

17. The method according to claim 15, comprising a step of closing the slit by welding.

18. The method according to claim 14, comprising the step of extruding and/or vulcanizing and/or polymerizing the insulating material in order to obtain the insulating cover.

19. The method according to claim 14, comprising the following steps:

providing a protective material suitable to make a protective jacket, and/or extruding the protective material in order to obtain a protective jacket on and/or over and/or all around the insulating cover or before or after the step of inserting the inner tube inside the insulating cover or applying the insulating cover around the inner tube, providing a tubular protective jacket or a sheet made of protective material suitable for making the protective jacket, and/or before or after the step of inserting the inner tube inside the insulating cover or applying the insulating cover around the inner tube, applying or obtaining a tubular jacket around the tubular insulating cover or coupling said sheet made of protective material to a sheet of insulating cover and then folding such coupled layers so as to obtain a tubular insulating cover with an outer tubular jacket.

20. The method according to claim 19, comprising the following steps:

knurling said protective jacket, in order to obtain a knurled or waved or rough or with annular rings pattern for said protective jacket, and/or cooling the pipe and/or the insulating cover and/or the protective jacket and/or the anti-corrosion layer, and/or cutting the pipe to a predetermined length, and/or marking the pipe, and/or winding the pipe in a reel.

21. A pipe suitable for conveying fluids in HVACR applications, said pipe consisting of:

an inner tube delimiting an inner space or passageway for a fluid;
an insulating cover;
an anti-corrosion layer; and
a protective jacket being an outermost layer;
said inner tube being made of an untreated metal, comprising at least one of copper, aluminium, stainless steel, or of a plastic material,
wherein said anti-corrosion layer is at least in part in contact with an outer surface of the metal or plastic inner tube, and wherein the anti-corrosion layer is extruded directly on the outer surface of the untreated metal or plastic inner tube without the use of glue or other adhesives, and
wherein said anti-corrosion layer comprises at least one of the following materials: polyvinyl chloride (PVC) or polyethylene (PE) or polyamide (PA), polyethylene of raised temperature (PERT), cross-linked polyethylene (PEX) based polymers, or mixture thereof.

22. A method for obtaining a pipe for conveying fluids in HVACR applications, comprising:

providing an inner tube delimiting an inner space or passageway for a fluid, an insulating cover and an anti-corrosion layer, said inner tube consisting of an untreated plastic material;

extruding an anti-corrosion material directly on at least one portion of an outer surface of the untreated plastic inner tube without the use of glue or other adhesives to form an anti-corrosion layer thereon; and at least one of inserting the inner tube coated with the anti-corrosion layer inside an insulating cover, or applying the insulating cover around the inner tube coated with the anti-corrosion layer, wherein said anti-corrosion layer comprises at least one of the following materials:
polyvinyl chloride (PVC) or polyethylene (PE) or polyamide (PA), polyethylene of raised temperature (PERT), cross-linked polyethylene (PEX) based polymers, or mixture thereof.

23. A method for obtaining a pipe for conveying fluids in HVACR applications, consisting of:

providing an inner tube delimiting an inner space or passageway for a fluid, an insulating cover and an anti-corrosion layer, said inner tube consisting of an untreated metal, comprising at least one of copper, aluminium, stainless steel, or of a plastic material;

extruding an anti-corrosion material on at least one portion of an outer surface of the untreated metal or plastic inner tube without the use of glue or other adhesives to form an anti-corrosion layer thereon; and at least one of inserting the inner tube coated with the anti-corrosion layer inside an insulating cover, or applying the insulating cover around the inner tube coated with the anti-corrosion layer, wherein said anti-corrosion layer comprises at least one of the following materials:
polyvinyl chloride (PVC) or polyethylene (PE) or polyamide (PA), polyethylene of raised temperature (PERT), cross-linked polyethylene (PEX) based polymers, or mixture thereof.

* * * * *